(12) United States Patent
Kirkpatrick

(10) Patent No.: US 10,631,085 B2
(45) Date of Patent: Apr. 21, 2020

(54) MICROPHONE ARRAY SYSTEM WITH ETHERNET CONNECTION

(71) Applicant: CRESTRON ELECTRONICS, INC., Rockleigh, NJ (US)

(72) Inventor: Philip Kirkpatrick, Washington, NJ (US)

(73) Assignee: CRESTRON ELECTRONICS, INC., Rockleigh, NJ (US)

(*) Notice: Subject to any disclaimer, the term of this patent is extended or adjusted under 35 U.S.C. 154(b) by 228 days.

(21) Appl. No.: 15/973,352

(22) Filed: May 7, 2018

(65) Prior Publication Data

US 2019/0342658 A1   Nov. 7, 2019

(51) Int. Cl.
*H04R 1/40* (2006.01)
*H04L 12/40* (2006.01)
*H04L 12/10* (2006.01)

(52) U.S. Cl.
CPC .......... *H04R 1/406* (2013.01); *H04L 12/10* (2013.01); *H04L 12/40136* (2013.01); *H04R 2201/003* (2013.01); *H04R 2420/09* (2013.01)

(58) Field of Classification Search
None
See application file for complete search history.

(56) References Cited

U.S. PATENT DOCUMENTS

| | | | |
|---|---|---|---|
| 3,824,342 | A | 7/1974 | Christensen et al. |
| 6,041,127 | A | 3/2000 | Elko |
| 9,635,186 | B2 | 4/2017 | Pandey et al. |

(Continued)

OTHER PUBLICATIONS

Digital Microphone Array, Design, Implementation and Speech Recognition Experiments, Erich Zwyssig From: Aug. 21, 2009 https://www.era.lib.ed.ac.uk/bitstream/handle/1842/3636/MScSLP.Erich+Zwyssig.pdf;sequence=1.

(Continued)

*Primary Examiner* — Harry S Hong
(74) *Attorney, Agent, or Firm* — Crestron Electronics, Inc.

(57) ABSTRACT

A microphone array configurable to connect via an Ethernet connection with an audio processor includes a plurality of MEMS microphones (7101-7121), a plurality of sigma-delta modulators (7201-7221), a processor and storage (90), and an Ethernet physical interface (80) operating at a network data transmission rate. Each sigma-delta modulator converts the analog output of a corresponding microphone into a bit stream at an audio sampling rate. The processor and storage performs a data-interleaving operation (92) to combine the bit streams from the sigma-delta modulators into a microphone audio frame serial bit stream (34), and loads the microphone audio frame serial bit stream into a FIFO memory (94) at a FIFO serial data load rate. The processor and storage computes an Ethernet FCS checksum on the microphone audio frame serial bit stream, concatenates, an FCS delay gap, the Ethernet FCS checksum, a timing gap, a frame prefix, a UDP/IP prefix, a payload, and the microphone audio frame serial bit stream to form an Ethernet frame packet serial bit stream, unloads this Ethernet packet serial bit stream from the FIFO memory at the network data transmission rate and transmits the Ethernet frame packet serial bit stream from the Ethernet physical interface.

34 Claims, 14 Drawing Sheets

(56) References Cited

U.S. PATENT DOCUMENTS

| | | | | |
|---|---|---|---|---|
| 2006/0204023 | A1* | 9/2006 | Stinson | H04R 1/406 381/122 |
| 2007/0253574 | A1* | 11/2007 | Soulodre | H04M 9/082 381/94.2 |
| 2011/0194704 | A1* | 8/2011 | Hetherington | H04M 3/568 381/26 |
| 2012/0093336 | A1* | 4/2012 | Said | G01S 5/18 381/92 |
| 2013/0058495 | A1 | 3/2013 | Furst et al. | |
| 2016/0148624 | A1* | 5/2016 | Jonan | G10L 21/10 381/92 |
| 2016/0302006 | A1 | 10/2016 | Pandey et al. | |
| 2016/0323668 | A1* | 11/2016 | Abraham | H04R 1/02 |
| 2017/0264999 | A1* | 9/2017 | Fukuda | H04N 5/2252 |

OTHER PUBLICATIONS

Hardware-Efficient Delta Sigma-Based Digital Signal Processing Circuits for the Internet-of-Things J. Low Power Electron. Appl. 2015, 5, 234-256; doi:10.3390/jlpea5040234 From: www.mdpi.com/2079-9268/5/4/234/pdf.

Microphone Array Beamforming; InvenSense Inc.; 1745 Technology Drive, San Jose,A pplication Note AN-1140 From: URL: https://www.invensense.com/wp-content/uploads/2015/02/Microphone-Array-Beamforming.pdf, Dec. 31, 2013.

Tomov, B. G., Stuart, M. B., Hemmsen, M. C., & Jensen, J. A. (2013). A Delta-Sigma beamformer with integrated apodization. In Proceedings of SPIE: Medical Imaging 2013: Ultrasonic Imaging, Tomography, and Therapy SPIE—International Society for Optical Engineering. DOI: 10.1117/12.2006731.

XCORE Microphone Array Hardware Manual; Document No. XM009730A;XMOS; 2016/3/2 From URL: https://www.xmos.com/download/private/xCORE-Microphone-Array-Hardware-Manual%281v1%29.pdf.

C. Dick and F. Harris, "FPGA signal processing using sigma-delta modulation," in IEEE Signal Processing Magazine, vol. 17, No. 1, pp. 20-35, Jan. 2000.

Implementation and Application of FPGA Platform with Digital MEMS Microphone Array; Proceedings of 4th International Conference on Electrical, Electronics and Computing Engineering, IcETRAN 2017.

Tutorial for MEMS microphones; Application note AN4426; DocID025704 Rev 2; Feb. 2017 From URL: http://www.st.com/resource/en/application_note/dm00103199.pdf.

Comparison of Interpolation Algorithms in Real-Time Sound Processing. In: Proceedings of the 3rd Conference of Czech Student AES Section on Audio Technologies and Processing. Bmo, 2002, pp. 60-66. From URL https://pdfs.semanticscholar.org/a5d0/84555ceff71cf53eeec328d67583f0e33f66.pdf.

Microphone Arrays : A Tutorial. Iain McGowan. Apr. 2001 From URL: http://www.aplu.ch/home/download/microphone_array.pdf.

* cited by examiner

222

| Version | IHL | DSCP | ECN | Total IP Packet Length (1500 bytes) |
|---|---|---|---|---|
| 0 1 0 0 | 0 1 0 1 | 1 0 1 1 0 0 | 0 0 | 1 0 1 0 0 0 0 0 1 1 1 1 1 1 |

| Identification (fragment) | Flags | Fragment Offset |
|---|---|---|
| 0 0 0 0 0 0 0 0 0 0 0 0 0 0 0 0 | 0 1 0 | 0 0 0 0 0 0 0 0 0 0 0 0 0 |

| Time to Live (1) | Protocol (UDP) | IP Header Checksum (0x2A91) |
|---|---|---|
| 0 0 0 0 0 0 0 1 | 0 0 0 1 0 0 0 1 | 0 1 0 0 0 1 0 1 1 0 0 1 1 0 0 0 |

| Source IP Address (192.168.1.201) |
|---|
| 0 0 1 1 0 0 0 0 0 0 0 1 0 1 0 1 1 0 0 0 0 0 0 1 1 0 0 1 0 0 1 1 |

| Destination IP Address (192.168.1.200) |
|---|
| 0 0 0 0 0 0 1 1 0 0 0 1 0 1 0 1 1 0 0 0 0 0 0 0 0 0 1 0 0 0 1 1 |

| UDP Source Port (0) | UDP Destination Port (330) |
|---|---|
| 0 0 0 0 0 0 0 0 0 0 0 0 0 0 0 0 | 1 0 0 0 0 0 0 0 0 1 0 1 0 0 1 0 |

| UDP Header & Data Length (1480 bytes) | UDP Checksum (0 – not used) |
|---|---|
| 1 0 1 0 0 0 0 0 0 0 1 0 0 1 1 | 0 0 0 0 0 0 0 0 0 0 0 0 0 0 0 0 |

| FCS Delay Gap (Checksum Computation) = 1.6 μsec | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | p/o 230

MICROPHONE ARRAY SYSTEM WITH ETHERNET CONNECTION

BACKGROUND OF THE INVENTION

Technical Field

This disclosure relates to a conferencing apparatus that uses an array of microphones, such as a ceiling mounted array, to replace individual microphones that would be located at various positions on a conference room table and a remote audio processing unit that is connected to the microphone array using an Ethernet connection. More specifically, electronic sensor steering algorithms can be used to simulate physical microphones by creating audio response lobe directional patterns and positions equivalent to each of the physical microphones that are being replaced.

Background Art

Electronic sensor steering was first developed for military radar applications, such as phased array radar systems that use a fixed array of antenna sensor elements instead of a rotating mechanical assembly. In a 'phased' array the outputs of each individual antenna sensor element is combined with both time-coincident and time-delayed outputs of the other individual antenna sensor elements in order to form a custom antenna pattern.

This 'steering' principle can be applied to sensors that detect acoustic waves, such as microphones based on Micro-Electro-Mechanical Systems (MEMS) technology, in a similar manner. For audio applications, the act of creating a response pattern that is equivalent to a physical microphone is known as "beam forming." For example, there are presently available MEMS microphone arrays, such as those manufactured by ClearOne Inc. and Shure Inc. that are each able to beam-form audio response patterns to simulate a limited number of physical microphones and provide corresponding audio outputs.

In order to achieve satisfactory audio quality using a traditionally ceiling-mounted microphone array within a conference room, the beam-forming signal processing function is performed within the microphone array circuitry before the resultant audio data from the microphone array is communicated as, for example, a digital audio signal consisting of 32-bit words being transmitted at 44.1 KHz or 48 kHz. It is known in the art to increase the amount of processing being performed at the microphone array to provide such other audio functions as echo cancellation, active microphone recognition, and ambient noise reduction. Microphone arrays traditionally are comprised of multiple microphones situated in predetermined patterns. The microphones may be arraigned, for example, in a circular pattern or as a grid pattern. It is known that increasing the number of microphones in an array can provide a sufficient number of raw signal inputs to allow for beam-forming and the various other audio processing functions required for operation within a conference room acoustical environment, such as ambient noise reduction and echo cancellation.

Although conventional microphone arrays replaced the need for physical microphones placed in inconvenient locations, these arrays disadvantageously require lobe pre-configuration and are only able to simulate a few microphones. The current teaching in art suggests that additional processing will be performed at the ceiling array to perhaps fine tune the beam-forming function or switch the order of beam-forming and echo cancellation functions.

Heretofore, the use of remotely (Ethernet) networked audio processors to directly process raw audio from an array of microphones, in a real-time environment, has been impractical largely due to network bandwidth limitations, the lack of processing power, the strict time delay limitations associated with acceptable audio, quantization based on audio sampling rates, and aliasing, which occurs in the analog-to-digital conversion operation prior to transmission of audio data.

SUMMARY OF THE INVENTION

It is to be understood that both the general and detailed descriptions that follow are exemplary and explanatory only and are not restrictive of the invention.

DISCLOSURE OF INVENTION

The present disclosure implements a conferencing solution that overcomes the above mentioned limitations and allows transmission of the output of sigma-delta modulated, but not converted to data-words, digital audio from individual microphones in a ceiling mounted array, which allows additional audio processing operations (e.g., beamforming and echo cancelation) to be performed by a remotely networked digital audio processor using high fidelity data transmitted over a fast Ethernet network.

According to a first aspect, a microphone array is networked via an Ethernet connection to an audio processor. Each microphone of the microphone array has a dedicated sigma-delta modulator. The microphone array includes a processor, storage, and an Ethernet physical interface. The Ethernet physical interface operates at a network data transmission rate, such as 100 BaseT.

Each sigma-delta modulator converts the analog output of a corresponding microphone into a bit stream at an audio sampling rate. The processor and storage performs a data-interleaving operation to combine the bit streams from the sigma-delta modulators into a microphone audio frame serial bit stream, and loads the microphone audio frame serial bit stream into a FIFO memory at a FIFO serial data load rate.

The processor and storage computes an Ethernet FCS checksum on the microphone audio frame serial bit stream, concatenates, an FCS delay gap, the Ethernet FCS checksum, a timing gap, a frame prefix, a UDP/IP prefix, a payload, and the microphone audio frame serial bit stream to form an Ethernet frame packet serial bit stream, unloads this Ethernet packet serial bit stream from the FIFO memory at the network data transmission rate and transmits the Ethernet frame packet serial bit stream from the Ethernet physical interface.

According to a second aspect, a method for processing data from a microphone array connected via an Ethernet connection to an audio processor. The method includes sensing acoustic pressure at a plurality of MEMS microphones by providing an analog voltage output corresponding to the sensed acoustic pressure. The method further includes converting an analog output of a corresponding microphone into a bit stream at an audio sampling rate using a plurality of sigma-delta modulators.

Each sigma-delta modulator compares an analog voltage with a reference voltage using a comparator provides an analog voltage output having a magnitude equal to the reference voltage with a negative polarity when a time-coincident bit within the bit stream is logic "0" and a positive polarity when the time-coincident bit within the bit stream is logic "1" using a switch controlled by the bit stream.

The method further includes, using a processor and storage to communicate at a operating network data transmission rate using an Ethernet physical interface.

The processor and storage perform data-interleaving operation is performed in order to combine the plurality of bit streams from the plurality of sigma-delta modulators into a microphone audio frame serial bit stream by loading the microphone audio frame serial bit stream into a FIFO memory at a FIFO serial data load rate.

The processor and storage compute an Ethernet FCS checksum on the microphone audio frame serial bit stream, by concatenating, within the FIFO memory, an FCS delay gap, the Ethernet FCS checksum, a timing gap, a constant prefix a payload preamble, and the microphone audio frame serial bit stream, to form an Ethernet frame packet serial bit stream. Preferably, the processor and storage unload the Ethernet packet serial bit stream from the FIFO memory at the data transmission rate and transmit the Ethernet frame packet serial bit stream to the Ethernet physical interface.

The present invention seeks to overcome or at least ameliorate one or more of several problems, including but not limited to: audio processing total delay time and audio sampling quantization.

BRIEF DESCRIPTION OF DRAWINGS

The accompanying figures further illustrate the present invention. Exemplary embodiments are illustrated in reference figures of the drawings. It is intended that the embodiments and figures disclosed herein are to be considered to illustrative rather than limiting.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
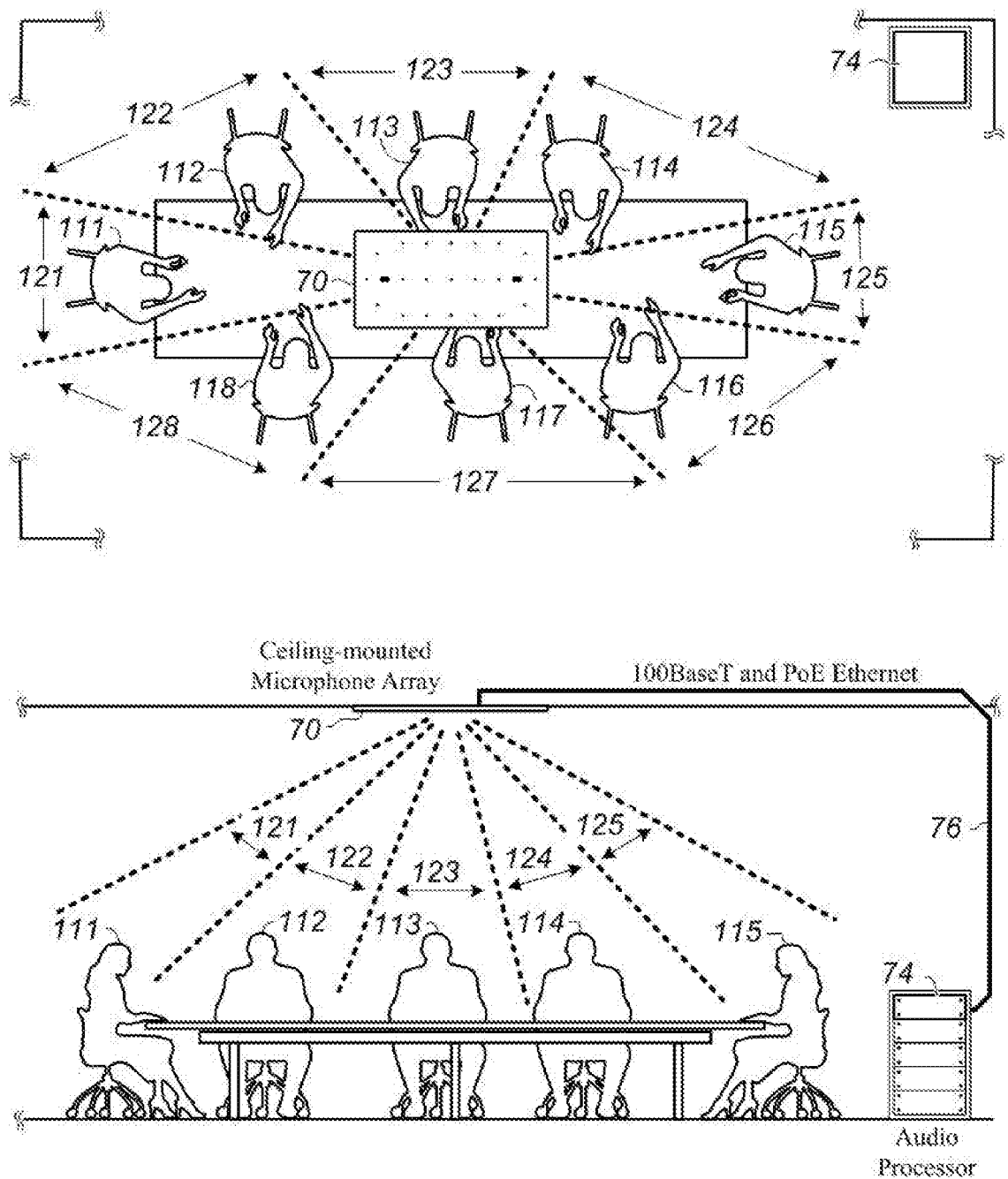

FIG. 1 shows a top view and a side view of a conference room, including a ceiling mounted microphone array and audio processor.

Figure 2:
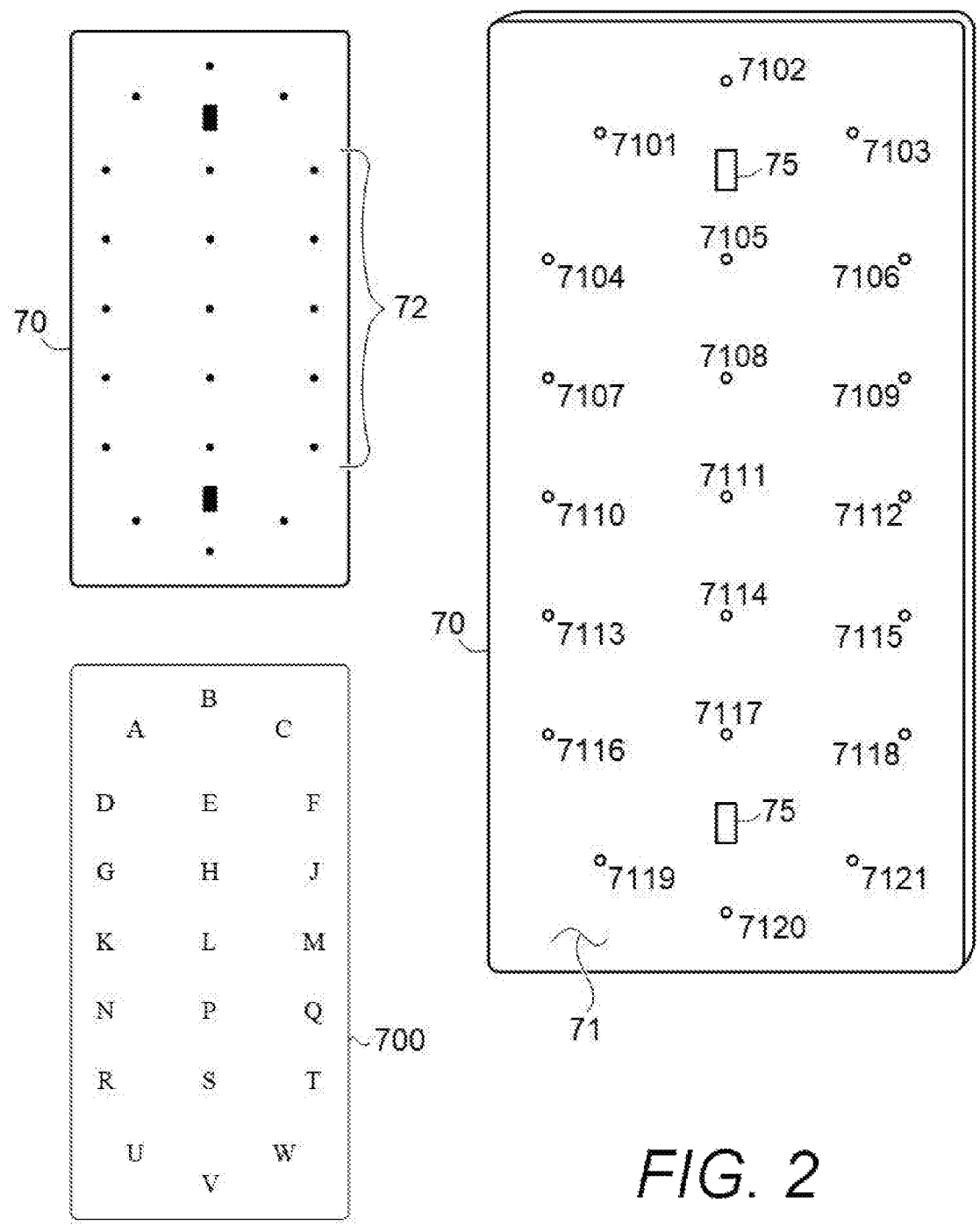

FIG. 2 illustrates an inventive ceiling-mounted microphone array, suitable for use within the conference room of FIG. 1, including twenty-one (21) microphone elements arranged in an extended circular pattern and a pair of temperature sensors.

Figure 3:
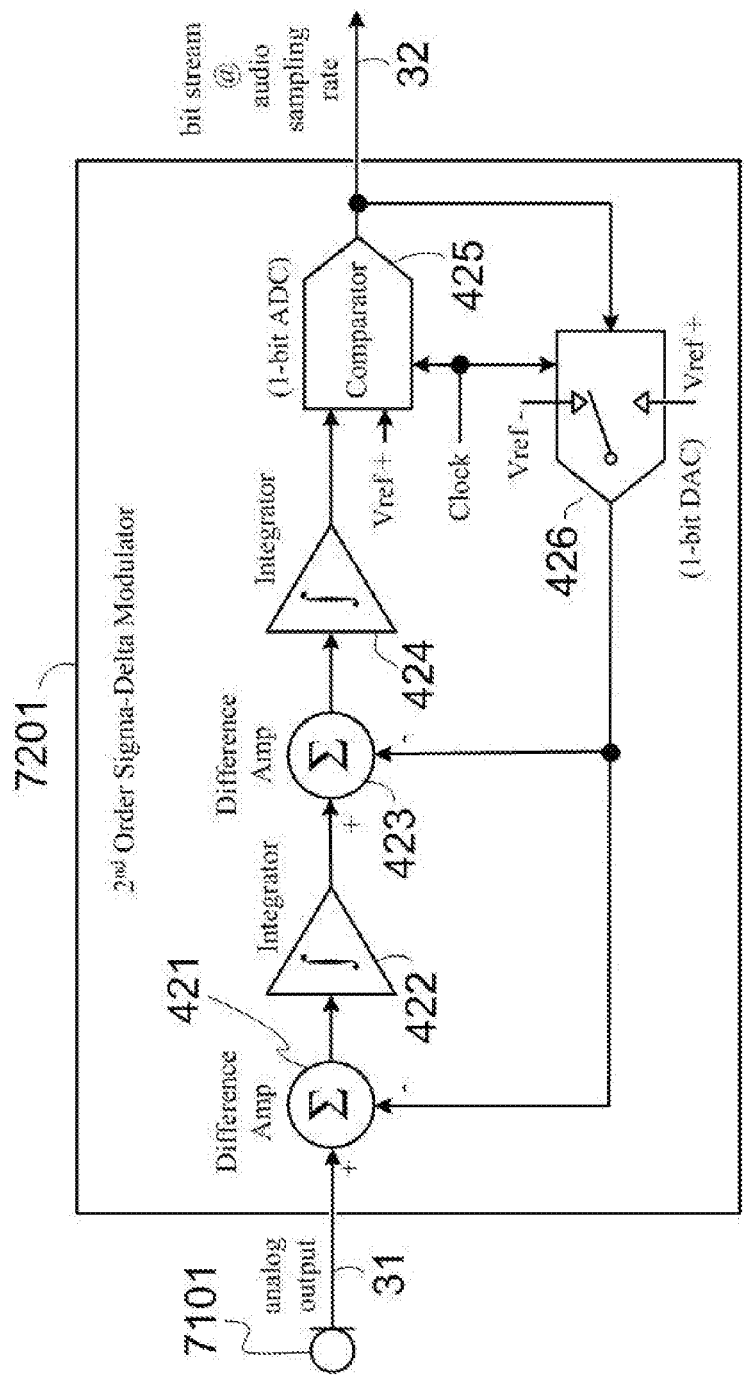

FIG. 3 depicts a second order 'sigma-delta' modulator being used to convert the analog output of a MEMS microphone into a bit stream at an audio sampling rate, in accordance with one illustrative embodiment of the invention.

Figure 4:
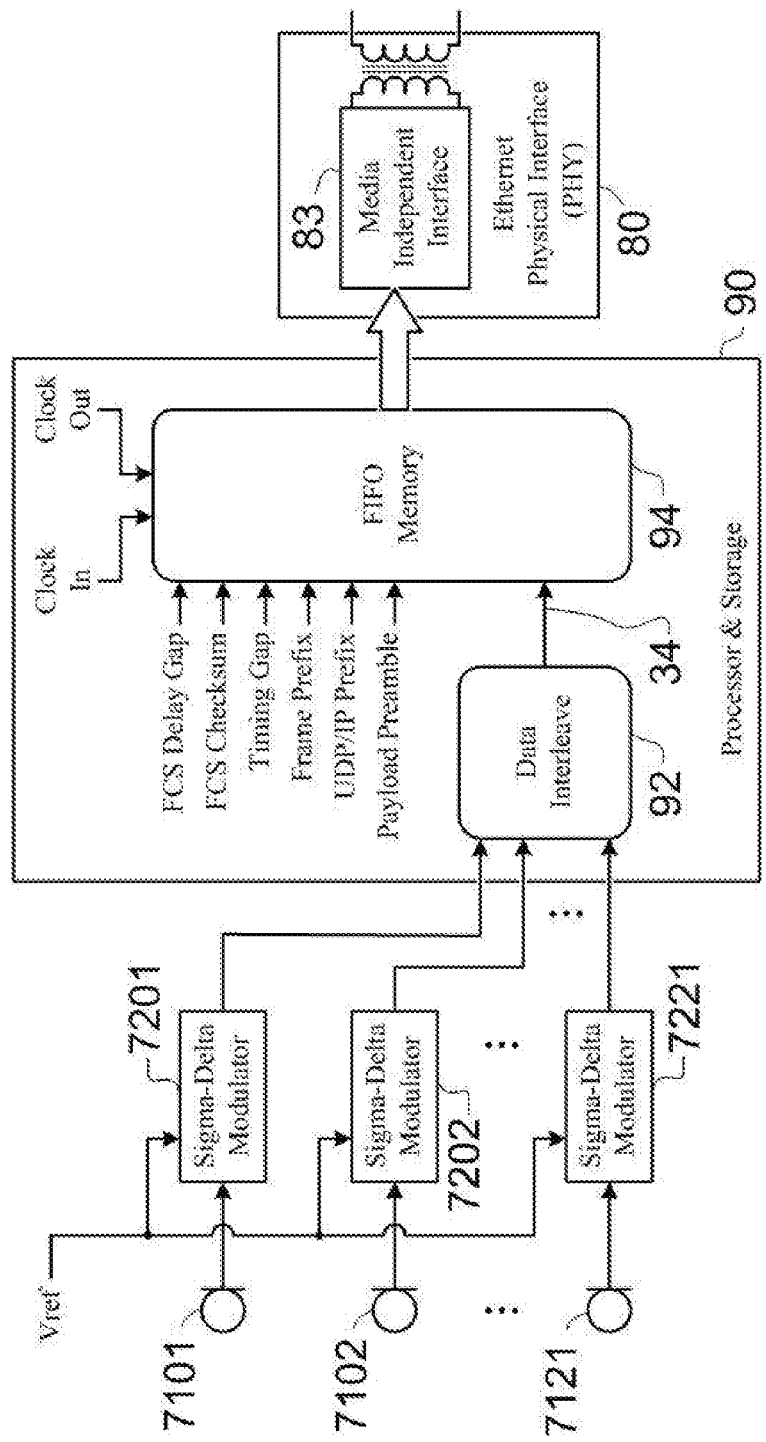

FIG. 4 schematically illustrates the signal flow from a plurality of MEMS microphones through a corresponding plurality of sigma-delta modulators and processor and storage elements to an Ethernet physical interface in accordance with an embodiment of the present invention.

Figure 5:
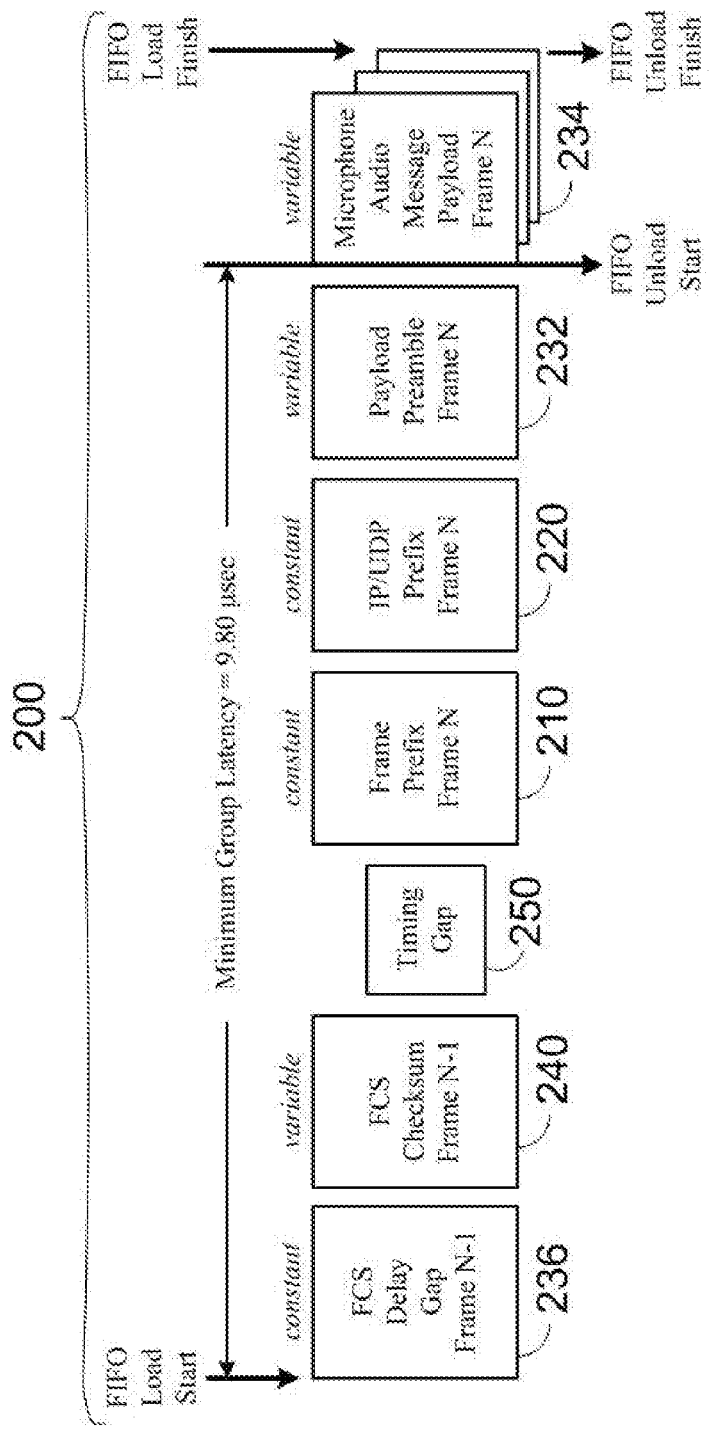

FIG. 5 is an illustrative embodiment of an Ethernet frame and related timing sequence suitable for transmitting an interleaved plurality of microphone audio bit streams at a minimum group latency in accordance with one illustrative embodiment of the present invention.

Figure 6:
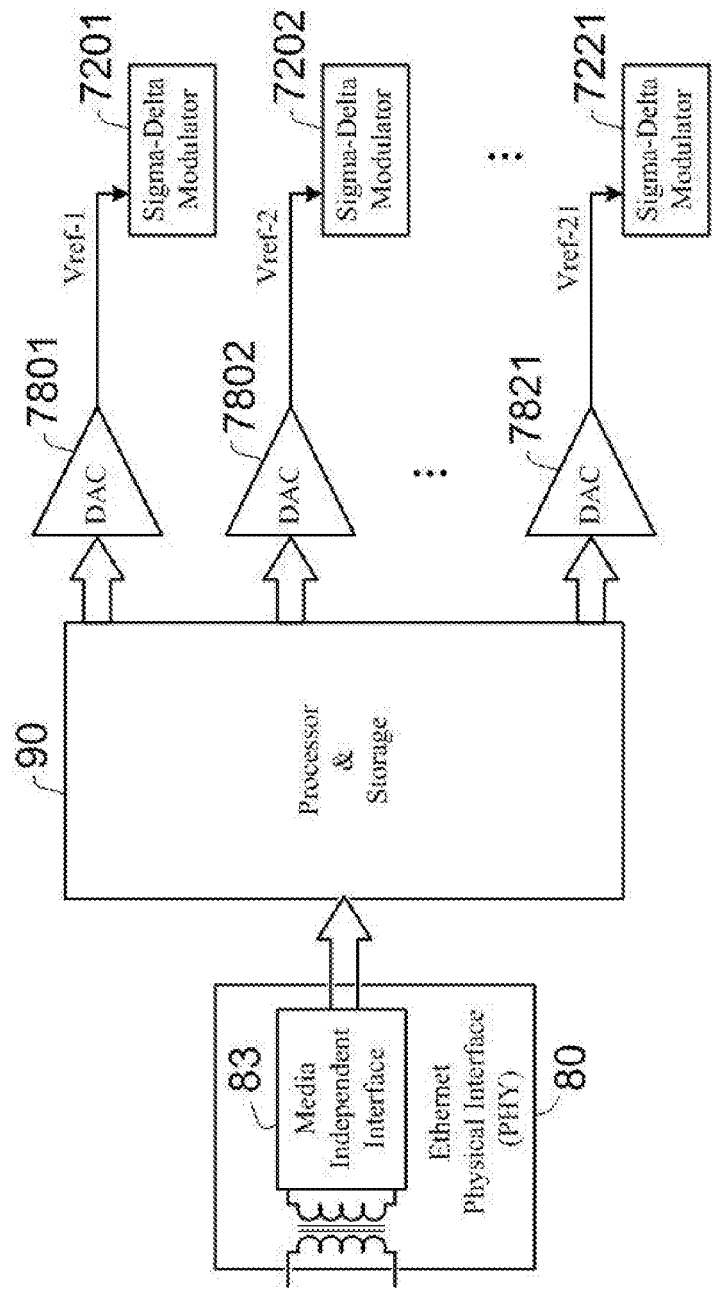

FIG. 6 depicts a further embodiment of the present invention in which individual sigma-delta modulators are optimized for converting individual MEMS microphone analog outputs into individual bit streams by adjusting individual voltage references in response to commands received from an Ethernet physical interface.

Figure 7:
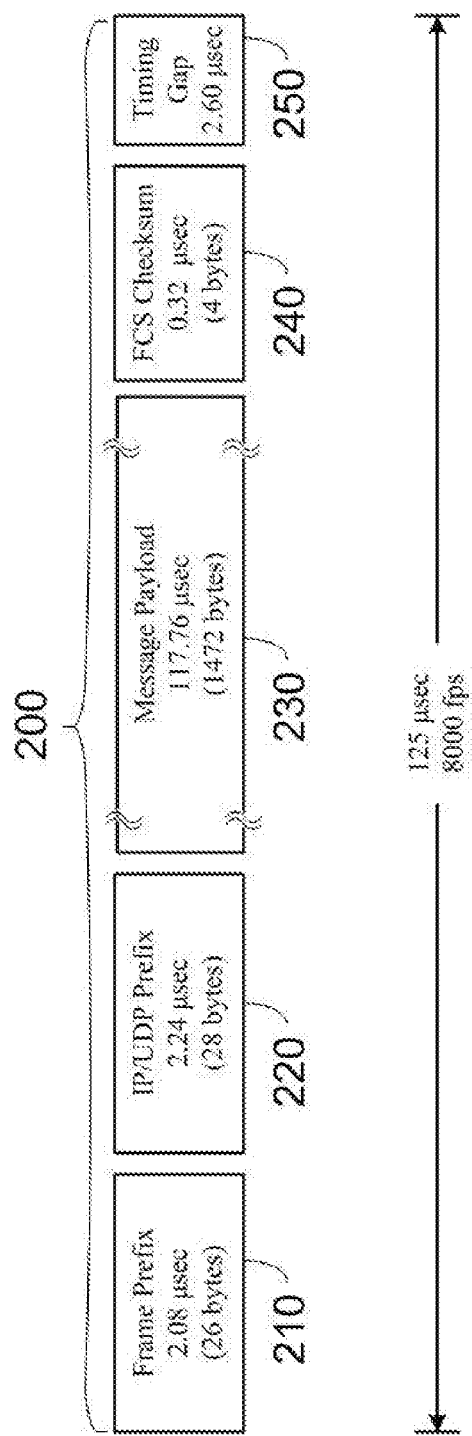

FIG. 7 depicts a further embodiment of the present invention in which the inventive Ethernet Frame is optimized for repetitive transmission at a rate of 8000 frames per second.

Figure 8:
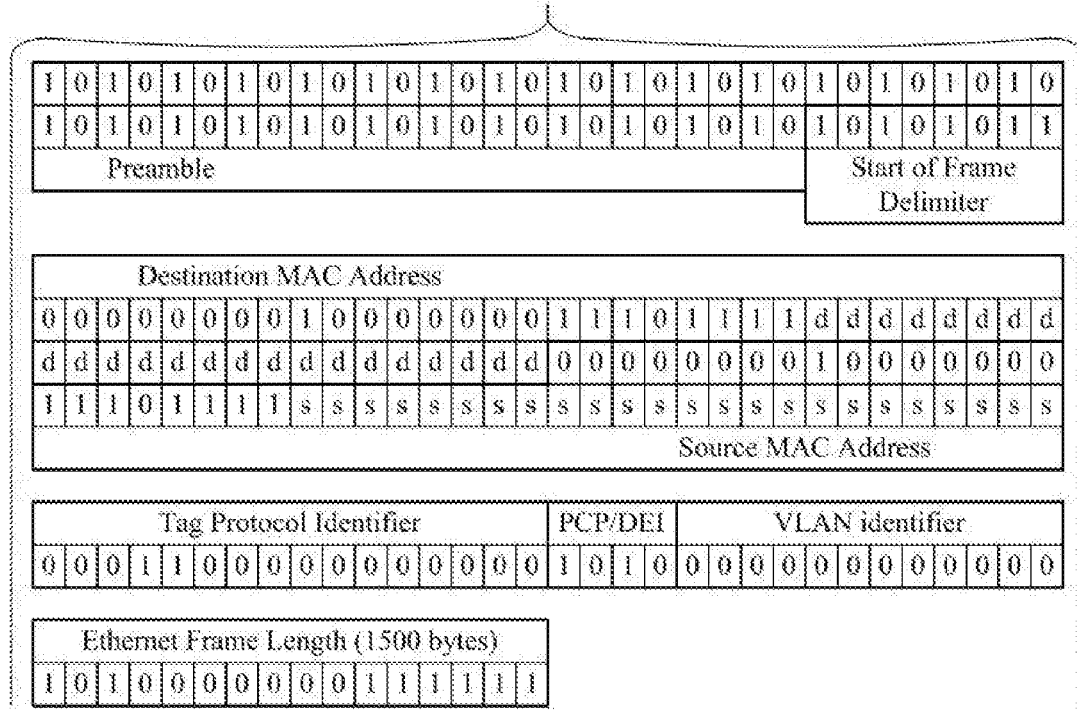

FIG. 8 further depicts an Ethernet frame prefix portion of the Ethernet frame shown in FIG. 7.

FIG. 9 further depicts an UDP/IP frame prefix portion of the Ethernet frame shown in FIG. 7.

Figure 10:
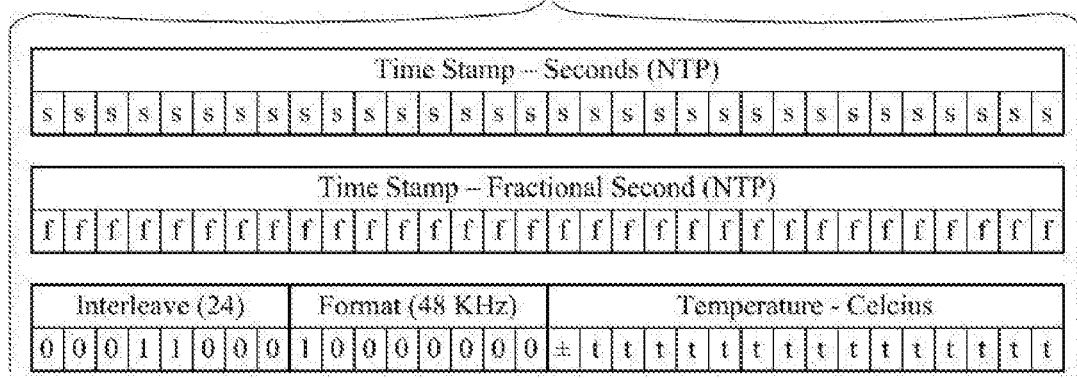

FIG. 10 further certain details regarding a payload preamble part of a message payload portion of the Ethernet frame shown in FIG. 7.

Figure 11:
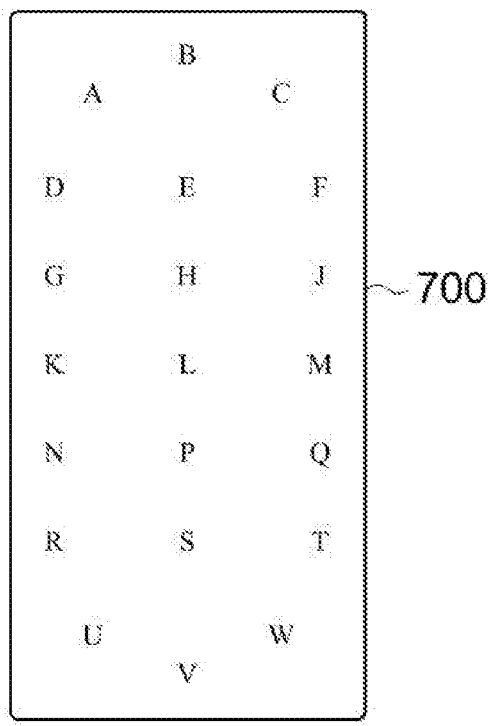

FIG. 11 further certain details regarding a message payload part of a message payload portion of the Ethernet frame shown in FIG. 7.

FIG. 12 further certain details regarding a FCS delay gap part of a message payload portion of the Ethernet frame shown in FIG. 7.

Figure 13:
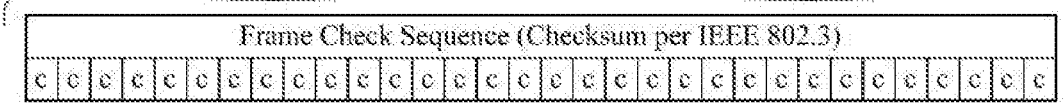

FIG. 13 further depicts a frame check sequence (i.e., checksum per IEEE-802.3) portion of the Ethernet frame shown in FIG. 7.

Figure 14:
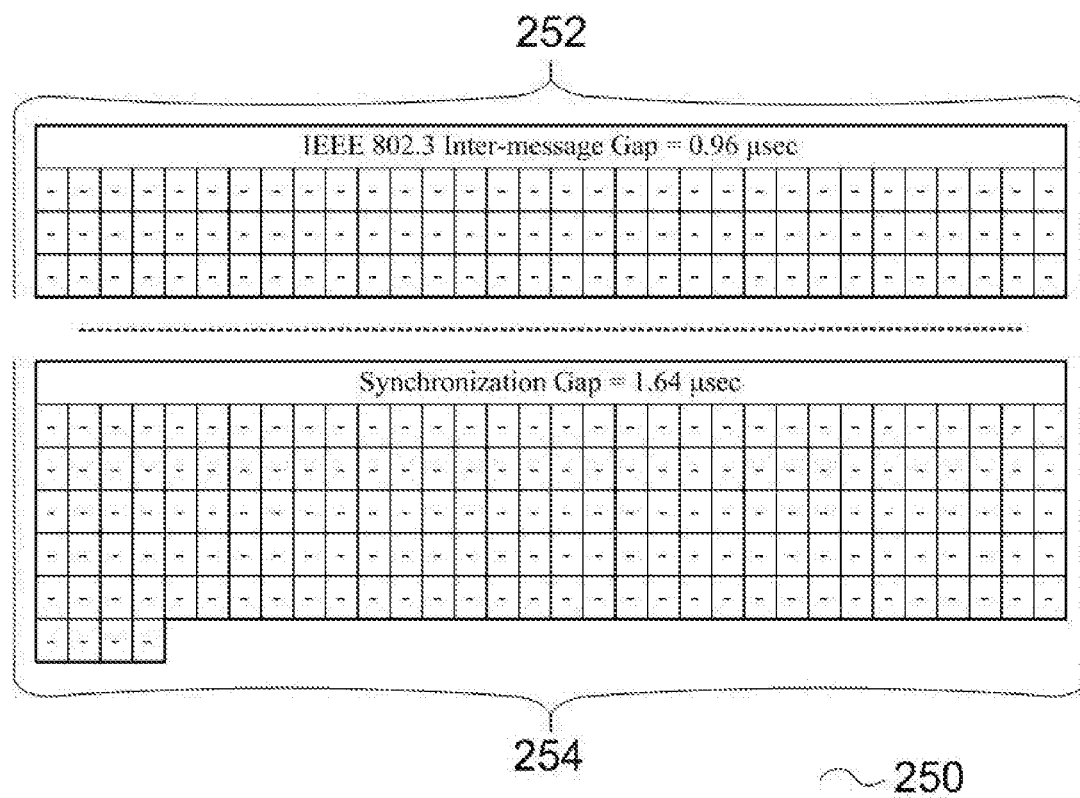

FIG. 14 further depicts a timing gap portion of the Ethernet frame shown in FIG. 7.

LIST OF REFERENCE NUMBERS FOR THE MAJOR ELEMENTS IN THE DRAWING

The following is a list of the major elements in the drawings in numerical order.

31 analog output (of one of microphones 7101-7121)
32 bit stream (output of one of sigma-delta modulators 7201-7221)
34 microphone audio frame serial bit stream (output of data-interleaving operation 92)
70 ceiling fixture (microphone array includes microphones 7101-7121, also identified as microphones A-V)
71 non-acoustically transparent outer surface (of ceiling fixture 70)
72 plurality of holes (extending through surface 71)
74 audio processor (performs functions such as beamforming, echo cancellation, and ambient noise reduction)
75 temperature sensor
76 Ethernet connection (e.g., 100 BaseT and PoE)
80 Ethernet physical interface
83 media independent interface (MII)
90 processor and storage
92 data interleave operation (performed by processor and storage 90)
94 FIFO memory (p/o processor and storage 90
111-118 conference room participants
121-128 beams (audio signals computed by combining and processing individual microphone outputs within microphone array 10)
200 Ethernet frame packet
210 frame prefix (p/o Ethernet packet 200)
220 UDP/IP prefix (p/o Ethernet packet 200)
222 IP header (p/o UDP/IP prefix 220)
224 UDP header (p/o UDP/IP frame prefix 220)
230 message payload (p/o Ethernet packet 200)
232 payload preamble (p/o message payload 230)
234 interleaved microphone audio data (p/o message payload 230)

236 FCS delay gap (used for checksum calculation) (p/o message payload 230)
240 FCS checksum (p/o Ethernet packet 200)
250 timing gap (between consecutive packets)
252 IEEE 802.3 inter-message gap (p/o timing gap 250)
254 synchronization gap (p/o interframe gap 250)
421 first difference amplifier (p/o one of sigma-delta modulators 7201-7221)
422 integrator (p/o one of sigma-delta modulators 7201-7221)
423 second difference amplifier (p/o one of sigma-delta modulators 7201-7221)
424 second integrator (p/o one of sigma-delta modulators 7201-7221)
425 comparator, 1-bit ADC (p/o one of sigma-delta modulators 7201-7221)
426 switch, 1-Bit DAC (p/o one of sigma-delta modulators 7201-7221)
700 reference guide for microphone placement on ceiling fixture 70 (showing correspondence between number and letter identifiers)
7101-7121 microphone (also A-V) (p/o ceiling fixture 70)
7201-7221 sigma-delta modulator (p/o ceiling fixture 70)
7801-7821 digital to analog converter (p/o ceiling fixture 70)

DETAILED DESCRIPTION OF THE INVENTION

The present invention is generally implemented as part of an integrated audio system provided within a conference room. Hence, an illustrative conference room and the interactions between participants having a meeting within that conference room will be described initially.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".
Mode(s) for Carrying Out the Invention FIG. 1 illustrates both a top view and a side view of a conference room environment according an exemplary embodiment of the present disclosure. The conference room environment includes a microphone array ceiling fixture 70 that is preferably mounted above one or more conference room participants 111-118. In one embodiment, microphone array ceiling fixture 70 communicates digitized audio signal packets over an Ethernet connection 76 to audio processor 74. In one embodiment of the present invention, the ceiling fixture is configured as a ceiling tile that is compatible with a drop mounted ceiling and in further embodiments, this ceiling tile configuration comprises acoustic or vibration damping material. In another embodiment where the ceiling fixture is configured as a ceiling tile, the non-acoustically transparent outer surface 71 extends below the plane of this ceiling tile.

In some embodiments, Ethernet connection 76 provides electrical power to microphone array ceiling fixture 70 using the Power over Ethernet (PoE) protocol. In the preferred embodiment, Ethernet connection 76 runs at the speed defined by the 100 BaseT protocol.

Audio processor 74 can perform various signal-processing algorithms on the digitized audio signal packets, such as, for example, echo cancelation, beam-forming, and ambient noise suppression.

Audio processor 74, which is configured to perform beam-forming, may be implemented in hardware or a suitable combination of hardware and software, and may include one or more software systems operating on a digital signal processing platform. The "hardware" may include a combination of discrete components, an integrated circuit, an application-specific integrated circuit, a field programmable gate array, a digital signal processor, or other suitable hardware. The "software" may include one or more objects, agents, threads, lines of code, subroutines, separate software applications, two or more lines of code or other suitable software structures operating in one or more software applications or on one or more processors.

The beam(s) 121-128 (also known as "lobes") are defined by audio processor 74 by processing of the various combinations of the audio output from individual microphones of the ceiling fixture 70. Accordingly, audio processor 74 is able to modify the effective beam pattern of the array of microphones of ceiling fixture 70 and electronically steer beam(s) 121-128, to different spatial positions, thereby allowing the acoustic discrimination of speech from conference room participants 111-118 based on their position within the conference room environment. In one embodiment, all conference room participants 111-118 are situated within one of beam(s) 121-128, respectively.

Through the use of beamforming algorithms, beams 121-128 can be configured with direction, beam-width, amplification level, and spatial selectivity characteristic to obtain coverage of conference room participant(s) 111-118, where such coverage is approximately equivalent to placing an individual microphone in front of each participant.

FIG. 2 illustrates an exemplary microphone configuration for the ceiling fixture 70 shown in FIG. 1. Ceiling fixture 70 includes a non-acoustically transparent outer surface 71 through which a plurality of holes 72 extend. Ceiling fixture 70 has twenty-one MEMS microphones 7101-7121 that are installed within the plurality of holes 72 which are arranged in an extended circular pattern. Advantageously, this pattern leverages two concepts, the first being a 'broadside' microphone array, in which a line of microphones are arranged perpendicular to the preferred direction of incoming sound waves. Broadside arrays will have a polar response pattern including two minima at 90° and 270°, respectively, where signal attenuation is very frequency-dependent. This response attenuation approaches perfect cancellation as the half-wavelength of the incident audio frequency approaches the spacing between the microphones.

The second concept is an 'end-fire' microphone array, which consists of multiple microphones arranged in line with the preferred direction of incoming sound waves. In the so-called 'differential' configuration, the signal output from the front microphone in the array (i.e., the first microphone that sound propagating on-axis reaches) is summed with an inverted and delayed signal output from the rear microphone.

Assuming that far-field audio propagation through space can be approximated by a plane wave, the sound picked up by the different microphones in the end-fire array configuration differ only in the arrival time. For example, in order to create a cardioid polar response pattern, the signal from a rear microphone should be delayed by the same time that it takes the sound waves to travel the distance between the two microphones.

It is important to note that in the present and due to the use of audio sampling at the kilohertz rate (i.e., 48 kHz) time measurement granularity is limited to approximately 20 microseconds (quanta). In contrast, the present invention uses pulse density modulated (PDM) audio to allow for a granularity of 0.05 microseconds.

The two concepts can be extended beyond using just two, microphones. For example, twenty-one (21) microphones can be combined using these same techniques.

In one embodiment, temperature sensors 75 are included in order to better calculate the speed of sound at the audio processor. The time that it takes sound waves to travel the distance between any two microphones of ceiling fixture 70 depends on the air temperature (e.g., the speed of sound in dry air is 331.2 meters per second at 0° C., and is 343 meters per second at 20° C.).

Advantageously, the combination of smaller granularity and temperature correction allows for much more precise audio processing, such as beamforming.

The extended circular pattern of the twenty-one microphones 7101-7121 of The array of microphones of ceiling fixture 70 encompasses the various combinations of broadside and end-fire configurations described above and allows the outputs of the individual microphones of ceiling fixture 70 to be processed at audio processor 74 to produce the beam(s) 121-128 (shown in FIG. 1) where each beam can be used to simulate a dedicated directional microphone for a particular participant in a conference room. In order to maintain visual aesthetics, certain embodiments of the present invention install a grille over outer surface 71 which covers both the surface and the plurality of holes 72 therethrough.

FIG. 3 is a block diagram of a second order sigma delta modulator 7201 suitable for use with a preferred embodiment of the present disclosure. Sigma delta modulator 7201 receives an analog output 31 from microphone 7101 at first difference amplifier 421. The output of first difference amplifier 421 enters integrator 422. A second difference amplifier 423 receives the resultant signal from integrator 422. The output of second difference amplifier enters a second integrator 424. A comparator, functioning as a 1-bit analog to digital converter 425 (ADC) being clocked at a sampling rate (e.g., 20 MHz) receives the resultant signal from second integrator 424 and generates a digital output signal as bit stream 32. A switch, functioning as a 1-bit Digital to analog converter 426 (DAC) being clocked at the sampling rate receives bit stream 32 and provides a fixed level of analog feedback control signal equal to Vref to first difference amplifier 421 and second difference amplifier 423.

FIG. 4 is a block diagram the signal flow from microphones 7101-7121 through a corresponding plurality of sigma-delta modulators 7201-7221 and processor and storage 90 to Ethernet physical interface 80. In a preferred embodiment Ethernet physical interface 80 includes a media independent interface 83.

The digital bit stream outputs of sigma-delta modulator(s) 7201-7221 are received by processor and storage 90. Processor and storage 90 performs a data interleave operation 92 and stores the result in FIFO memory 94. The resulting information is read out of the FIFO memory 94 and transferred through a media independent interface 83 over portion of Ethernet physical interface 80.

Refer now to FIG. 5 and continue to refer to FIG. 4. FIG. 5 shows a modified Ethernet frame packet 200 suitable for transmitting an interleaved plurality of microphone audio bit streams at a minimum group latency, in accordance with the present invention. In this modification, information from both an immediately preceding frame (N−1) and an immediate frame (N) are illustrated in order to show the temporal relation between the microphone audio frame serial bit stream 34, that is being loaded as source data into the first-in first-out (FIFO) memory 94 and destination data (i.e., for transmission via an Ethernet connection) that is being unloaded from the FIFO memory 94.

Processor and storage 90 starts computing the required frame check sequence (FCS) checksum, in accordance with IEEE-802.3, for frame (N−1) and loading the FIFO memory at approximately the same time. In one embodiment, the time allotted for computing this checksum is 1.6 microseconds and this allotted time is accounted for by providing an FCS delay gap 236, which is further defined as a five, all-zero padded, 32-bit words, as shown in FIG. 12.

The results of the FCS checksum computation for frame (N−1), FCS checksum 240, is appended to the Ethernet frame packet for frame (N−1) along with timing gap 250. FCS checksum 240 is further defined as a single 32-bit word, as shown in FIG. 13.

The timing gap 250 is the time between subsequent Ethernet frames, such as for example frame (N−1) and frame (N) and consists of two portions, as illustrated in FIG. 14. The first portion represents the minimum time allowed between subsequent Ethernet frames as defined by IEEE-802.3 and which for purposes of this disclosure is identified as IEEE 802.3 inter-message gap 252. The second portion represents the time required to synchronize the Ethernet frames at a desirable rate, such as 8000 frames per second and which for purposes of this disclosure is identified as synchronization gap 254. In a preferred embodiment of the present invention the synchronization gap is nominally 1.64 microseconds long. In further preferred embodiments of the present invention, the synchronization gap 254 is adjustable in order to compensate for transmission skew and maintain a constant frame transmission rate of, for example, 8000 frames per second.

The portion of Ethernet frame 200 that is shown after the timing gap 250 relates to data that is being transmitted in the present frame (N). Frame prefix 210 and IP/UDP prefix 220 comply with the IEEE-802.3 requirement for "user datagram protocol/Internet protocol" communications over an Ethernet connection. Further details regarding an example of frame prefix 210 and IP/UDP prefix 220 suitable for use with the present invention are shown in FIGS. 8 and 9 respectively, which also separately identifies the IP header 222 and UDP header 224 portions of the IP/UDP prefix 220.

Payload preamble 232 includes time stamp and temperature data, which advantageously can be used by audio processor 74 to more precisely compute the audio processing functions described above. Further details regarding an example of payload prefix 232 suitable for use with the present invention is shown in FIG. 10.

Message payload 230 contains multiple repetitions of the microphone audio frame serial bit stream 34 that have been unloaded from the FIFO memory 94. As further detailed in FIG. 11, these multiple repetitions are identified as interleaved microphone audio data 234. For example, one exemplary microphone array in accordance with present invention includes twenty-one separate MEMS microphones 7201-7221, that can also be referred to as microphones 'A', 'B', 'C', 'D', 'E', 'F', 'G', 'H', 'J', 'K', 'L', 'M', 'N', 'P', 'Q', 'R', 'S', 'T', 'U', and 'V', and where 120 repetitions of the audio frame serial bit stream 34 are loaded into the interleaved microphone audio data 234 portion of the message payload 230.

Refer now to FIG. 6 which depicts a further embodiment of the present invention, similar to the description give above for FIG. 4. As shown in FIG. 6, each of the individual sigma-delta modulators 7201-7221 can base their modulation on individualized reference voltages (Vref-1, Vref-2, . . . , Vref-21). These individualized reference voltages are set by Ethernet command messages that are transmitted from the audio processor 74 and received by the individual microphones at the ceiling fixture 70. More specifically, these command messages are received at the Ethernet physical interface 80 and passed through the media independent interface 83 and the processor and storage 90 to a plurality of digital to analog converters 7801-7821, where each individualized reference voltage is generated.

Refer now to FIG. 7 which shows Ethernet frame packet 200 being presented in normal order, that is, all data shown for this packet is related to the present frame (N). In this preferred embodiment of the present invention, the inventive Ethernet frame packet 200 is optimized for repetitive transmission at a rate of 8000 frames per second with the related timing and byte count information being identified for each of the: frame prefix 210, IP/UDP prefix 220, message payload 230, FCS checksum 240, and timing gap 250.

FIG. 8 depicts an Ethernet frame prefix 210 portion of the Ethernet frame shown in FIG. 7.

FIG. 9 depicts an UDP/IP frame prefix 220 portion of the Ethernet frame shown in FIG. 7 and further depicts the separate IP header 222 UDP header 224 portions of the UDP/IP frame prefix 220.

FIG. 10 depicts certain details regarding a payload preamble 232 portion of the message payload 230 shown in FIG. 7.

FIG. 11 depicts certain details regarding an interleaved microphone audio data 234 portion of the message payload 230 shown in FIG. 7, includes reference guide (for microphone array 70) 700, and is further described above.

FIG. 12 depicts certain details regarding a FCS delay gap 236 portion of the message payload 230 shown in FIG. 7, and is further described above.

FIG. 13 depicts certain details regarding a FCS checksum 240 (i.e., checksum per IEEE-802.3) portion of the Ethernet frame 200 shown in FIG. 7, and is further described above.

FIG. 14 certain details regarding a timing gap 250 portion of the Ethernet frame 200 shown in FIG. 7 and further depicts the separate IEEE 802.3 inter-message gap 252 and synchronization gap 254 portions of the timing gap 250.

INDUSTRIAL APPLICABILITY

To solve the aforementioned problems, the present invention is a unique microphone array system in which raw audio data streams from sigma-delta modulators are interleaved within an Ethernet frame and transmitted via an Ethernet connection to a cooperating audio processor for echo cancellation, beam-forming, ambient noise reduction and other audio processing.

LIST OF ACRONYMS USED IN THE
DETAILED DESCRIPTION OF THE
INVENTION

The following is a list of the acronyms used in the specification in alphabetical order.
100 BaseT IEEE Ethernet standard (transmission speed of 100 Mbps, baseband signaling and twisted wire pair)
μsec microsecond
A-V reference letters used to identify individual microphones within an array of microphones
ADC analog to digital converter
DAC digital to analog converter
DEI drop eligible indicator (per IEEE 802.3)
DSCP differentiated services code point (per IEEE 802.3)
ECN explicit congestion notification (per IEEE 802.3)
FCS frame check sequence (per IEEE 802.3)
FPGA field programmable gate array
IEEE Institute of Electrical and Electronic Engineers
IEEE 802.3 collection of IEEE standards (defining the physical layer and data link layer's media access control of wired Ethernet)
IHL Internet header length (per IEEE 802.3)
IP Internet protocol
KHz kilohertz
MAC media access control (per IEEE 802.3)
Mbps megabits per second
MEMS micro-electro-mechanical systems
MHz megahertz
MII media independent interface (per IEEE 802.3)
N integer representing a present frame
N−1 integer representing an immediately previous frame
N+1 integer representing an immediately subsequent frame
NTP network time protocol
PCP priority control point (per IEEE 802.3)
PDM pulse density modulation
PHY Ethernet physical interface
PoE power over Ethernet
UDP user datagram protocol
VLAN virtual local area network (per IEEE 802.3)
Vref reference voltage

What is claimed is:

1. A microphone array ceiling fixture (70) connected via an Ethernet connection (76) to an audio processor (74), said ceiling fixture comprising:
  (a) a plurality of MEMS microphones (7101-7121), each of said microphones sensing acoustic pressure at its position and providing an analog voltage output corresponding to said sensed acoustic pressure;
  (b) a plurality of sigma-delta modulators (7201-7221), each sigma-delta modulator converting an analog output of a corresponding microphone into a bit stream (32) at an audio sampling rate, wherein each sigma-delta modulator further comprises:
    (i) a comparator (425) that compares an analog voltage with a reference voltage (Vref), and
    (ii) a switch (426) controlled by said bit stream that provides an analog voltage output having a magnitude equal to said reference voltage with a negative polarity when a time-coincident bit within said bit stream is logic "0" and a positive polarity when said time-coincident bit within said bit stream is logic "1";
  (c) an Ethernet physical interface (80) operating at a network data transmission rate; and
  (d) a processor (90) and storage operably coupled between said plurality of sigma-delta modulators and said Ethernet physical interface, said processor and storage configured to
    (i) perform a data-interleaving operation to combine said plurality of bit streams from said plurality of sigma-delta modulators into a microphone audio frame serial bit stream,
    (ii) load said microphone audio frame serial bit stream into a FIFO memory (94) at a FIFO serial data load rate,
    (iii) compute an Ethernet FCS checksum on said microphone audio frame serial bit stream,
    (iv) concatenate, within said FIFO memory, an FCS delay gap, said Ethernet FCS checksum, a timing gap, a constant prefix, and a payload preamble, and said microphone audio frame serial bit stream, to form an Ethernet frame packet serial bit stream, and (v) unload said Ethernet packet serial bit stream from said FIFO memory at said data transmission rate and transmit said Ethernet frame packet serial bit stream to said Ethernet physical interface.

2. The ceiling fixture of claim 1 wherein
said audio sampling rate is between 2 MHz and 3 MHz.

3. The ceiling fixture of claim 1 wherein
each reference voltage associated with said comparator of each of said plurality of sigma-delta modulators is settable by said audio processor.

4. The ceiling fixture of claim 1 further comprising:
(a) a PoE compatible power supply; and wherein
(b) said Ethernet physical interface is PoE compatible.

5. The ceiling fixture of claim 1 wherein
said Ethernet physical interface further comprises a media independent interface.

6. The ceiling fixture of claim 1 wherein
(a) said Ethernet physical interface conforms to 100BaseT; and
(b) said network data transmission rate is 100 million bits per second.

7. The ceiling fixture of claim 1 wherein
said processor and storage further comprise a field programmable gate array.

8. The ceiling fixture of claim 1 wherein
said Ethernet frame contains a message payload comprising a plurality of sequential sets of interleaved microphone data.

9. The ceiling fixture of claim 8 wherein
said constant prefix further comprises a frame prefix and an IP/UDP prefix.

10. The ceiling fixture of claim 9 wherein
(a) said message payload can be represented by a frame contained within a time sequential series of frames, said present frame can be identified as "frame N", said immediately previous frame can be identified as "frame N−1", and said immediately subsequent frame can be identified as "frame N+1"; and
(b) said concatenated Ethernet frame packet comprises
  (i) said FCS delay gap corresponding to said time required to calculate a checksum for frame N−1,
  (ii) said Ethernet FCS checksum corresponding to frame N−1;
  (iii) said timing gap,
  (iv) said frame prefix corresponding to frame N,
  (v) said IP/UDP prefix corresponding to frame N,
  (vi) said payload preamble corresponding to frame N, and
  (vii) said message payload corresponding to frame N.

11. The ceiling fixture of claim 1 wherein
said payload preamble further comprises a time stamp field.

12. The ceiling fixture of claim 1 further comprising:
(a) a temperature sensor; and
(b) wherein said payload preamble further comprises a temperature field for storing a value from said temperature sensor.

13. The ceiling fixture of claim 1 wherein
said Ethernet frame is transmitted is repeatedly transmitted at a rate of 8000 frames per second.

14. A method for processing data from a microphone array connected via an Ethernet connection by an audio processor, comprising:
(a) sensing acoustic pressure at a plurality of MEMS microphones and providing an analog voltage output corresponding to said sensed acoustic pressure; and
(b) converting an analog output of a corresponding microphone into a bit stream at an audio sampling rate using a plurality of sigma-delta modulators, each wherein each sigma-delta modulator comprises:
  (i) comparing an analog voltage with a reference voltage using a comparator, and
  (ii) providing an analog voltage output having a magnitude equal to said reference voltage with a negative polarity when a time-coincident bit within said bit stream is logic "0" and a positive polarity when said time-coincident bit within said bit stream is logic "1" using a switch controlled by said bit stream; and
(c) performing a data-interleaving operation to combine said plurality of bit streams from said plurality of sigma-delta modulators into a microphone audio frame serial bit stream using a processor and storage, said a processor and storage:
  (i) loading said microphone audio frame serial bit stream into a FIFO memory (94) at a FIFO serial data load rate,
  (ii) computing an Ethernet FCS checksum on said microphone audio frame serial bit stream;
  (iii) concatenating, within said FIFO memory, an FCS delay gap (236), said Ethernet FCS checksum, a timing gap, a constant prefix, a payload preamble, and said microphone audio frame serial bit stream, to form an Ethernet frame packet serial bit stream,
  (iv) communicating at operating at a network data transmission rate using an Ethernet physical interface;
  (v) unloading said Ethernet packet serial bit stream from said FIFO memory at said data transmission rate; and
  (vii) transmitting said Ethernet frame packet serial bit stream to said Ethernet physical interface.

15. The method of claim 14 wherein
said audio sampling rate is between 2 MHz and 3 MHz.

16. The method of claim 14 wherein
each reference voltage associated with said comparator of each of said plurality of sigma-delta modulators is settable by said audio processor.

17. The method of claim 14 further comprising:
(a) a PoE compatible power supply; and wherein
(b) said Ethernet physical interface is PoE compatible.

18. The method of claim 14 wherein
said Ethernet physical interface further comprises a media independent interface.

19. The method of claim 14 wherein
(a) said Ethernet physical interface conforms to 100BaseT; and
(b) said network data transmission rate is 100 million bits per second.

20. The method of claim 14 wherein
said processor and storage further comprise a field programmable gate array.

21. The method of claim 14 wherein
said Ethernet frame contains a message payload comprising a plurality of sequential sets of interleaved microphone data.

22. The method of claim 21 wherein
(a) said constant prefix further comprises a frame prefix and an IP/UDP prefix.

23. The method of claim 22 wherein:
(a) said message payload can be represented by a frame contained within a time sequential series of frames, said present frame can be identified as "frame N", said immediately previous frame can be identified as "frame N-1", and said immediately subsequent frame can be identified as "frame N+1"; and
(b) said concatenated Ethernet frame packet comprises
(i) said FCS delay gap corresponding to said time required to calculate a checksum for frame N-1,
(ii) said Ethernet FCS checksum corresponding to frame N-1;
(iii) said timing gap,
(iv) said frame prefix corresponding to frame N,
(v) said IP/UDP prefix corresponding to frame N,
(vi) said payload preamble corresponding to frame N, and
(vii) said message payload corresponding to frame N.

24. The method of claim 14 wherein
said payload preamble further comprises a time stamp field.

25. The method of claim 14 further comprising:
(a) a temperature sensor; and
(b) wherein said payload preamble further comprises a temperature field.

26. The method of claim 14 wherein
said Ethernet frame is transmitted is repeatedly transmitted at a rate of 8000 frames per second.

27. A microphone array system comprising:
(a) a ceiling fixture (70) having a non-acoustically transparent outer surface (71) and further comprising
(i) a plurality of holes (72) extending through said non-acoustically transparent outer surface and being arranged in a predetermined array pattern (A-W),
(ii) a plurality of microphones (7101-7121), each of said microphones being mounted in a corresponding one of said holes;
(iii) a plurality of sigma-delta modulators, each converting an analog output of a corresponding microphone into a bit stream at an audio sampling rate;
(b) an audio processor (74) remotely located from the ceiling fixture; and
(c) an Ethernet connection (76), wherein
(i) the audio processor is operatively connected to the ceiling fixture via said Ethernet connection and is configured to process the bit streams produced by each of said sigma-delta modulators.

28. The system according to claim 27, wherein
each of said holes is covered with an acoustically transparent material having a surface that is coplanar with the non-acoustically transparent outer surface of said ceiling fixture.

29. The system according to claim 27, further comprising:
a grille mounted over the non-acoustically transparent outer surface of said ceiling fixture.

30. The system according to claim 27, wherein
the ceiling fixture is configured as a ceiling tile that is compatible with a drop mounted ceiling.

31. The system according to claim 30, wherein
the ceiling tile comprises acoustic or vibration damping material.

32. The system according to claim 30, wherein
the non-acoustically transparent outer surface extends below the plane of said ceiling tile.

33. A ceiling fixture comprising:
(a) a non-acoustically transparent outer surface;
(b) a plurality of holes extending through said non-acoustically transparent outer surface and being arranged in a predetermined array pattern;
(c) a plurality of microphones, each of said microphones being mounted in a corresponding one of said holes;
(d) a plurality of sigma-delta modulators, each converting an analog output of a corresponding microphone into a bit stream at an audio sampling rate of between approximately 2 MHz and 3 MHz;
(e) an Ethernet physical interface operating at a network data transmission rate of between approximately 10 MHz and 1 GHz; and
(f) a processor and storage operably coupled between said plurality of sigma-delta modulators and said Ethernet physical interface, said processor and storage configured to
(i) combine said plurality of bit streams from said plurality of sigma-delta modulators into a microphone audio frame serial bit stream,
(ii) form said microphone audio frame serial bit stream into an Ethernet frame packet serial bit stream, and
(iii) transmit said Ethernet frame packet serial bit stream to said Ethernet physical interface; wherein
(g) ceiling fixture is configured as a ceiling tile that is compatible with a drop mounted ceiling.

34. The system according to claim 27, further comprising:
a grille mounted over the non-acoustically transparent outer surface of said ceiling fixture.

* * * * *